United States Patent
Avino

Patent Number: 5,320,145
Date of Patent: Jun. 14, 1994

[54] APPARATUS FOR DRAINING CONTAINERS AND THE LIKE

[76] Inventor: Alan J. Avino, 2007 Windemere Cir., Schaumburg, Ill. 60194

[21] Appl. No.: 53,092

[22] Filed: Apr. 26, 1993

[51] Int. Cl.⁵ ............................................. F16N 31/00
[52] U.S. Cl. ......................................... 141/98; 141/97; 141/114; 141/314; 184/1.5; 184/106; 2/16
[58] Field of Search ................ 141/1, 98, 114, 97, 141/314; 184/1.5, 106; 220/571, 573; 277/101; 2/16

[56] References Cited

U.S. PATENT DOCUMENTS

| | | | |
|---|---|---|---|
| 3,214,317 | 7/1980 | Kelly, Sr. | |
| 3,570,009 | 3/1971 | Spruell | |
| 3,806,952 | 4/1974 | Viciulis | |
| 4,344,468 | 8/1982 | Sandberg | 141/69 |
| 4,485,853 | 12/1984 | Gunderson | 141/1 |
| 4,569,377 | 2/1986 | Ellis | 141/98 |
| 4,572,692 | 3/1986 | Frank et al. | 277/101 X |
| 4,578,823 | 4/1986 | Hudson, Jr. | |
| 4,736,488 | 4/1988 | Nielsen | |
| 4,765,887 | 8/1988 | Lister | 277/101 X |
| 4,984,299 | 1/1991 | Halldórsdóttir | |
| 4,991,633 | 2/1991 | Wong | 141/5 |
| 5,121,776 | 6/1992 | Kovach | 141/98 |

FOREIGN PATENT DOCUMENTS 0008173  2/1980  European Pat. Off. ............ 277/101

*Primary Examiner*—Ernest G. Cusick
*Attorney, Agent, or Firm*—Greer, Burns & Crain, Ltd.

[57] ABSTRACT

Apparatus for draining waste matter from a container includes a bucket-like vessel with an opening in the bottom, and a glove secured to the bottom opening. The glove fits over an upwardly extending lip which extends about the circumference of the bottom opening. The glove may be secured to the lip by a hose clamp and the like, so that a tight seal is established. The clamp also allows replacement of the glove as needed.

17 Claims, 1 Drawing Sheet

APPARATUS FOR DRAINING CONTAINERS AND THE LIKE

FIELD OF THE INVENTION

The present invention relates to apparatus for draining containers and the like. More particularly, this invention relates to a device which allows a user to remove the drain plug in the bottom of a plumbing drain trap, engine oil pan, engine transmission, radiator and the like, and contain any liquid or other contents which leaks from around the drain plug during loosening or removal. After the drain plug is removed, the device collects the rest of the contents in a receptacle so that the user avoids being splashed by the contents or spilling the contents onto the floor.

BACKGROUND OF THE INVENTION

A problem which arises in draining containers, such as plumbing drain traps, oil pans and the like, is the spillage of fluids contained within the containers when they are drained. For example, when a bath tub is unable to drain due to a blockage in the trap in the drainage piping, waste matter in the trap typically splashes onto the plumber or other user and the surrounding fixtures or floor during removal of the trap drain plug and drainage of the trap, thus requiring clean-up.

An additional problem is that frequently the container plugs contain bolts, washers or other things which may become lost if allowed to fall to the ground or floor.

U.S. Pat. No. 5,121,776 to Kovach discloses a flexible fluid drainage bag which is configured to be secured to the bottom surface of a crank case of an automobile by magnets. The device includes a glove-like pouch to permit manual grasping for removal and replacement of the crank case drain plug. However, the device is not easy to control during use because the bag is flexible. Moreover, if the magnets fell off of the oil pan during use, the contents of the bag could spill. Also, the device would be difficult to use for plumbing drain traps and the like, where there may not be sufficient metal surface for attachment of magnets.

For all of these reasons, there is a need for an apparatus which is easy and convenient to use in a variety of applications such as for draining plumbing traps, oil pans and the like, and which prevents spillage when draining.

Therefore, one object of the present invention is to provide a new and improved apparatus for draining containers and the like.

Another object is to provide a device which catches and contains waste matter released from a container or the like when a drain plug is removed and the container is drained. A related object is to prevent splashing of the waste matter onto the surrounding environment or user of the device during the draining process.

A further object of the invention is to provide a container draining device which can be used in a wide variety of applications in plumbing, vehicle maintenance and the like, and is easy and convenient to use.

Still another object is to provide a container draining device in which parts such as a leakproof glove or hose clamp can be removed and replaced easily.

SUMMARY OF THE INVENTION

Accordingly, the present invention provides an apparatus for draining waste matter from a container and contains the waste matter for later disposal. The apparatus includes a vessel, such as a bucket, having an opening in the bottom, and a leakproof glove removably secured about the opening by a hose clamp or other suitable device which allows for removal and replacement of the glove as needed.

More specifically, the present apparatus includes a bucket-like vessel having a lower generally planar surface and a peripheral sidewall integrally attached to and extending upward of the surface. The lower surface forms an aperture, and an integrally attached, upwardly extending lip extends about the circumference of the aperture. A glove-like hand covering has a lower portion which circumferentially extends about the lip. A hose clamp or other suitable device secures and seals the glove around the aperture so that a seal is established. The hose clamp also allows for easy replacement of the glove as needed.

DETAILED DESCRIPTION

Although this invention will be described in the context of plumbing repairs and draining plumbing drain traps, the invention is not limited to that field and may also be used by auto mechanics and other users who drain containers, including automotive crankcases, radiators, transmissions and the like.

Figure 1:
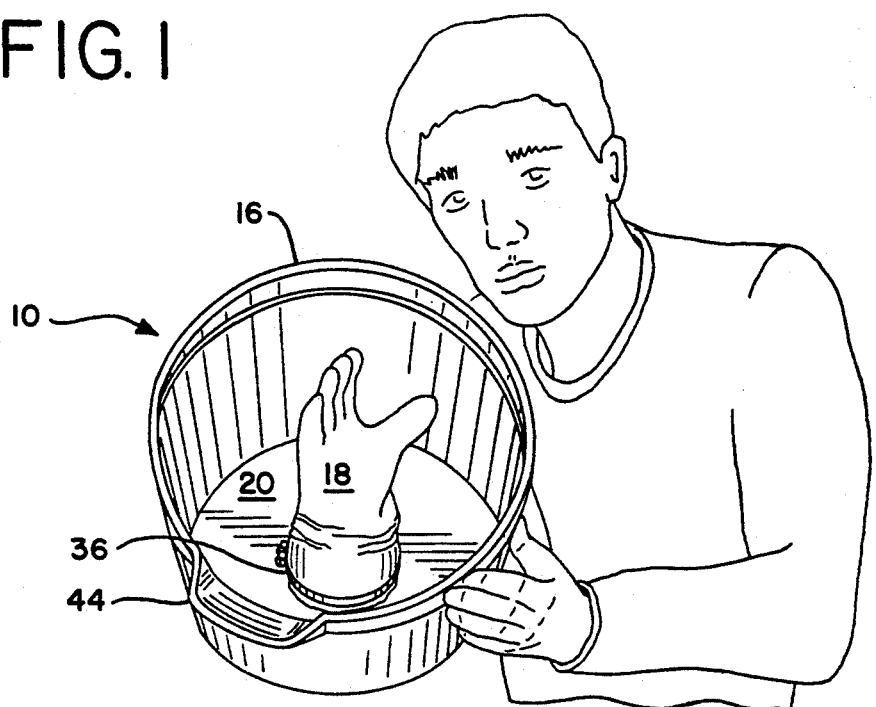
FIG. 1 is a perspective view of an embodiment of the present invention.
Figure 2:
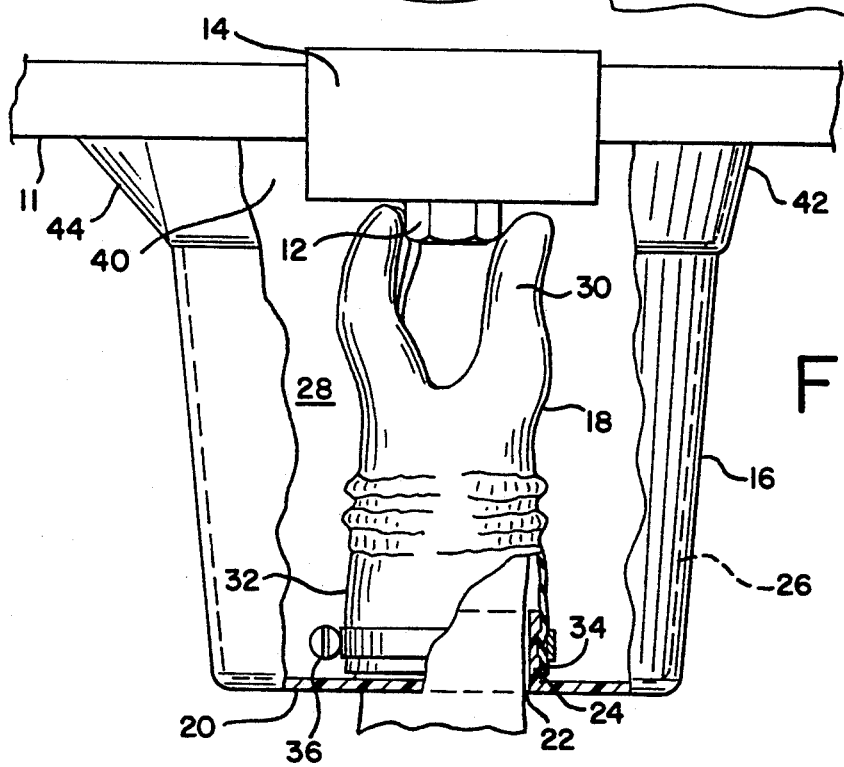
FIG. 2 is a front elevational view of the tool of FIG. 1, partially broken away, shown abutting a fragmentary view of a plumbing fixture.

Referring to FIG. 1, apparatus 10 is shown disposed about the arm of a user. In FIG. 2, the apparatus 10 is disposed beneath a plumbing drain pipe 11 and circumscribes a drain plug 12 of a tub drain trap 14, which accumulates waste matter over time.

The apparatus 10 includes a bucket-like containment vessel such as a bucket 16 and a replaceable hand cover 18. The containment vessel or bucket 16 includes a lower generally planar surface 20 having a circular configuration. The lower surface 20 forms an opening 22 which is sized to allow the passage of a human hand and forearm. Connected to the lower surface 20 and extending peripherally about the opening 22 is an upwardly extending lip 24. The lip 24 is preferably integral with the lower surface 20.

The containment vessel 16 also includes an upwardly extending sidewall 26 which is integrally joined to the periphery of the lower surface 20. The sidewall 26 and lower surface 20 define a containment chamber 28.

Figure 3:
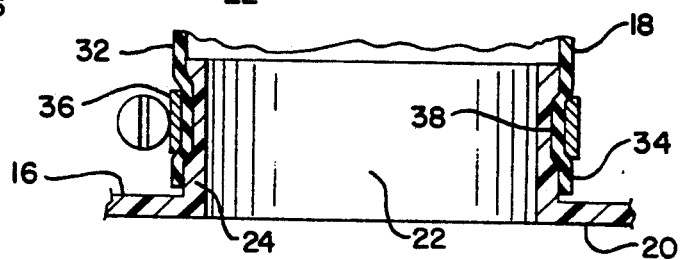
FIG. 3 is a front elevational cross-sectional view of a portion of the tool of FIG. 1, showing the connection between the hand covering and the containment vessel.

Extending upward through the containment chamber 28 is the hand cover 18. The hand cover 18 preferably consists of a leakproof glove having a hand portion 30 and a lower neck portion 32. The glove could be left-handed or right-handed as desired, and could also be adapted to fit either the left or right hand. A mitten could also be used. Referring to FIG. 3, the circumference of a tubular end portion 34 of the neck portion 32 fits about and achieves a snug fit with the outer circumferential surface of the lip 24. The bottom end portion 34 is secured to the outside surface of the lip 24 by an adjustable hose clamp 36, a cable tie or the like. The clamp 36 produces an inwardly directed radial force which compresses the end portion 34 and lip 24 together to form a tight seal. The clamp 36 may be loosened to allow for removal of the hand cover 18 from the lip 24 and replacement of the hand cover 18 as needed.

To fix the location of the hose clamp 36, the outside surface of the lip 24 may form an indentation 38 which circumferentially extends about the lip and is sized to register or seat the clamp 36. The registration between the indentation 38 and clamp 36 acts to properly seat and seal the clamp and prevent the clamp from inadvertent movement which might otherwise break the seal between the hand cover 18 and the lip 24.

The height of the sidewall 26 and neck portion 32 of the hand cover 18 are preferably sized so that about half of the fingers extend above the upper end 42 when the hand cover 18 is fully extended. This allows the user to place a large wrench on the drain plug 12 and hold it with one hand in the hand cover 18 and the other hand on the wrench outside the bucket 16. When the wrench is no longer needed, it can be removed, and the bucket 16 can be pushed up and around the fixture 14, as in FIG. 2. The drain plug 12 can then be removed by hand.

The hand cover 18 may be made of an elastic polymer with sufficient toughness to generally withstand the scrapes and impacts which occur in working with plumbing tools and components. Commonly available household rubber gloves are suitable for this purpose. However, should the hand cover 18 be damaged, the clamp 36 may be loosened and/or removed for replacement. In addition, should the activity involve working with high temperature waste matter, the cover 18 may also include an inner layer of insulation.

The containment vessel 16 may be made of a material which is rigid enough to have a permanent configuration, but may be flexed somewhat to allow manipulation into tight areas. Such materials include but are not limited to polyethylenes, polypropelyenes and the like, and may be opaque or clear, as desired. The vessel 16 may include a lip 44, if desired, to facilitate disposal of the waste matter in the vessel 16.

In operation, the user places the upper end 42 of the containment vessel 16 near or against the fixture 14 so that the sidewall 26 circumscribes the drain plug 12. A hand is extended through the opening 22 and neck portion 32 and into the hand portion 30 of the hand cover 18. The user can then loosen and remove the drain plug 12, so that the waste matter in the trap 14 drains into the containment chamber 28 without contaminating the hand. If during removal of the drain plug 12 a spray of waste matter is formed, the sidewall 26 prevents the waste matter from being splashed into the environment or onto the user. Once the waste matter has drained into the containment chamber 28, the hand may be withdrawn and the plumbing tool 10 carried to a receptacle for disposal of the waste matter and cleaning of the apparatuses 10.

The advantages of the invention are now self-apparent. Plumbing drain traps, engine oil crankcases, radiators, transmissions and the like are easily and conveniently drained, without spilling the drained waste matter on the user or surrounding environment. The user's hand is not contaminated when the drain plug is removed, and the device is easily controlled to prevent spillage. The glove can be replaced without difficulty, and the device can be cleaned easily after use. In all, the expense of the device is quickly recovered by the time saved because the user's hand and person, and the surrounding floor and environment, do not require cleaning.

A specific embodiment of the novel apparatus for draining containers according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. Apparatus for draining waste matter from a container comprising:
   an open top vessel forming an opening in the bottom thereof;
   a hand cover in said vessel, said hand cover being placed about said bottom opening so that a user's hand can be inserted through said bottom opening and into said hand cover; and
   means for securing said hand cover around said bottom opening so that said hand cover forms a seal around said bottom opening,
   said vessel including a lower generally rigid planar surface and a peripheral generally rigid sidewall integrally attached to and extending upward of said planar surface to form an open top containment chamber, said bottom opening being formed in said lower planar surface and spaced from said sidewall by said lower planar surface.

2. The apparatus of claim 1 wherein said securing means is removable so that said hand cover can be removed and replaced as needed, 3. The apparatus of claim 2 wherein said removable securing means comprises a hose clamp, 4. The apparatus of claim 1 wherein said vessel further includes an upwardly extending lip integral with the periphery of said opening, said hand cover being secured to said lip.

5. The apparatus of claim 4 wherein the outer surface of said lip forms an indentation which extends about the circumference of said lip, said identation being sized to register and seat said removable securing means.

6. The apparatus of claim 4 wherein said hand cover includes an upper hand portion and a lower neck portion, said neck portion being secured to said lip and said hand portion being generally disposed in the opening of said vessel.

7. The apparatus of claim 1 further comprising a container, wherein the container is a plumbing drain trap.

8. The apparatus of claim 1 further comprising a container, wherein the container is an engine crankcase oil pan.

9. The apparatus of claim 1 further comprising a container, wherein the container is a transmission.

10. The apparatus of claim 1 further comprising a container, wherein the container is a radiator.

11. Apparatus for containing waste matter drained from a container, the apparatus comprising:
    a vessel of generally permanent configuration, said vessel including a lower generally planar surface and a peripheral sidewall integrally attached to and extending upward of said lower surface, said lower surface forming a bottom opening which is spaced from said sidewall by said lower surface;

a lip integrally attached to and extending upward from said lower surface, said lip extending about the periphery of said bottom opening;

a hand cover in said vessel, said hand cover having a lower end portion circumscribing said lip and a hand portion; and means for securing said hand protector to said lip so that a seal is established between said lip and said protector.

12. The apparatus of claim 11 wherein said securing means is removable so that said hand protector can be removed and replaced.

13. The apparatus of claim 11 further comprising a container, wherein the container is a plumbing drain trap.

14. The apparatus of claim 11 further comprising a container, wherein the container is an engine crankcase oil pan.

15. The apparatus of claim 11 further comprising a container, wherein the container is a transmission.

16. The apparatus of claim 11 further comprising a container, wherein the container is a radiator.

17. Apparatus for draining waste matter from a container comprising:

an open top vessel having a generally planar bottom and an outer sidewall attached to and extending upward of said planar bottom, said bottom having an opening which is spaced from said sidewall by said planar bottom, a hand cover in said vessel, said hand cover being placed about said bottom opening so that a user's hand can be inserted through said bottom opening and into said hand cover; and means for securing said hand cover around said bottom opening so that said hand cover forms a seal around said bottom opening, said securing means being removable so that said hand cover can be removed and replaced as needed, said vessel further including an upwardly extending lip integral with the periphery of said opening, said hand cover being secured to said lip, the outer surface of said lip forming an indentation which extends about the circumference of said lip, said trough being sized to register and seat said removable securing means.

* * * * *